United States Patent
McElvain et al.

(10) Patent No.: US 7,517,947 B2
(45) Date of Patent: Apr. 14, 2009

(54) POLYMER TRANSFER WITHIN A POLYMERIZATION SYSTEM

(75) Inventors: Robert R. McElvain, Kingwood, TX (US); John D. Hottovy, Kingwood, TX (US); Bryan M. Garner, Friendswood, TX (US); Gregory G. Hendrickson, Kingwood, TX (US); John H. Tait, Stafford, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 49 days.

(21) Appl. No.: 11/467,284

(22) Filed: Aug. 25, 2006

(65) Prior Publication Data

US 2006/0287442 A1  Dec. 21, 2006

Related U.S. Application Data

(63) Continuation of application No. 11/146,616, filed on Jun. 7, 2005, now Pat. No. 7,109,290.

(60) Provisional application No. 60/577,821, filed on Jun. 7, 2004.

(51) Int. Cl.
C08F 6/24 (2006.01)
C08F 10/06 (2006.01)

(52) U.S. Cl. ............... 528/501; 526/64; 526/65; 406/124

(58) Field of Classification Search ............ 526/64, 526/65; 528/501, 503; 406/124, 146
See application file for complete search history.

(56) References Cited

U.S. PATENT DOCUMENTS

| | | | |
|---|---|---|---|
| 3,772,262 A | 11/1973 | Clementi | |
| 3,816,383 A | 6/1974 | Stotko | |
| 4,621,952 A * | 11/1986 | Aronson | 406/138 |
| 5,558,472 A * | 9/1996 | Ogawa et al. | 406/12 |
| 6,051,061 A | 4/2000 | Sawamura et al. | |
| 6,476,161 B1 * | 11/2002 | Harlin et al. | 526/65 |
| 6,541,570 B2 | 4/2003 | Beccarini et al. | |
| 6,586,531 B2 | 7/2003 | Washiyama et al. | |
| 6,838,531 B2 | 1/2005 | Reid et al. | |
| 6,914,104 B2 * | 7/2005 | Kougo | 526/65 |
| 6,927,260 B2 | 8/2005 | Berhalter et al. | |

(Continued)

FOREIGN PATENT DOCUMENTS

CA  2350507  *  5/2000

(Continued)

Primary Examiner—Fred M Teskin
(74) Attorney, Agent, or Firm—Conley Rose, P.C.; Rodney B. Carroll; Daniel E. Burke

(57) ABSTRACT

A method for transferring polymer within a polymerization system, comprising continuously withdrawing the polymer from the reactor and conveying the polymer from a reactor to a flash chamber via a pressure differential between the reactor and the flash chamber. A method for transferring polymer within a polymerization system comprising conveying the polymer from a reactor to a flash chamber via a pressure differential between the reactor and the flash chamber and purging interstitial gases from the polymer prior to conveying the polymer from the sash chamber to a purge column. A method for transferring polymer within a polymerization system comprising conveying the polymer from a flash chamber directly to a purge column via a pressure differential between the flash chamber and the purge column.

21 Claims, 1 Drawing Sheet

U.S. PATENT DOCUMENTS

| | | |
|---|---|---|
| 7,109,290 B2 | 9/2006 | McElvain et al. |
| 2005/0113521 A1 | 5/2005 | Pelliconi et al. |
| 2005/0272874 A1 | 12/2005 | Pelliconi et al. |
| 2006/0041072 A1 | 2/2006 | Pelliconi et al. |

FOREIGN PATENT DOCUMENTS

| | | |
|---|---|---|
| EP | 1 415 999 A1 | 5/2004 |
| WO | WO 00/11076 | 3/2000 |
| WO | WO 01/19915 A1 | 3/2001 |
| WO | WO 01/44367 A1 | 6/2001 |
| WO | WO 02/28958 A2 | 4/2002 |
| WO | WO 03/031514 A1 | 4/2003 |
| WO | WO 03/037981 A1 | 5/2003 |
| WO | WO 03/046021 A1 | 6/2003 |
| WO | WO 03/076511 A1 | 9/2003 |
| WO | WO 2004/003072 A1 | 1/2004 |
| WO | WO 2004/003073 A1 | 1/2004 |
| WO | WO 2004/087805 A1 | 10/2004 |
| WO | WO 2005/103140 A1 | 11/2005 |
| WO | WO 2005/121240 A1 | 12/2005 |
| WO | WO 2005/124324 A1 | 12/2005 |

* cited by examiner

POLYMER TRANSFER WITHIN A POLYMERIZATION SYSTEM

CROSS-REFERENCE TO RELATED APPLICATIONS

This is a Continuation Application claiming priority to U.S. Pat. No. 7,109,290, and entitled "Polymer Transfer Within a Polymerization System," which claims the benefit under 35 U.S.C. § 119(e) of U.S. Provisional Application Ser. No. 60/577,821, filed Jun. 7, 2004 and entitled "Polymer Transfer Within a Polymerization System", both hereby incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to transferring polymer within a polymerization system, for example between a polymerization reactor and an extruder.

BACKGROUND OF THE INVENTION

Polymer products, or polymer fluff, within a polymerization system may be transferred from a polymerization reactor to a compounding step, such as an extrusion of polymer into pellets. The capital costs associated with the equipment and processes necessary to execute such a transfer may be significant. In addition to transferring polymer, such equipment and processes may also function to purge solvents or other fluids or contaminants that may be entrapped among the polymer solids. Examples of typical steps and equipment needed to accomplish such polymer transfers may include conveying systems involving hydraulics, pneumatics, and/or pressurized air; high pressure and low pressure solvent flash and recovery systems; flow control systems; lock hoppers; purge columns; and disengaging vessels. With existing designs, both the equipment and power necessary to accomplish movement of the polymer between the reactor and compounding step are cost prohibitive. Thus, a need exists for more efficient polymer transfer systems and methods.

SUMMARY OF THE INVENTION

Disclosed herein is a method for transferring polymer within a polymerization system, comprising continuously withdrawing the polymer from a reactor and conveying the polymer from the reactor to a flash chamber via a pressure differential between the reactor and the flash chamber. Interstitial gases may be purged from the polymer, as described herein, The polymer may then be conveyed from the flash chamber to a purge column via a pressure differential between the flash chamber and the purge column.

Also disclosed herein is a method for transferring polymer within a polymerization system comprising conveying the polymer from a reactor to a flash chamber via a pressure differential between the reactor and the flash chamber and purging interstitial gases from the polymer prior to conveying the polymer from the flash chamber to a purge column. In an aspect, the flash chamber can be located at least about 100 horizontal feet from the reactor.

Also disclosed herein is a method for transferring polymer within a polymerization system comprising conveying the polymer from a flash chamber directly to a purge column via a pressure differential between the flash chamber and the purge column. The polymer may be heated during transfer from the flash chamber to the purge column.

DETAILED DESCRIPTION OF THE INVENTION

Figure 1:
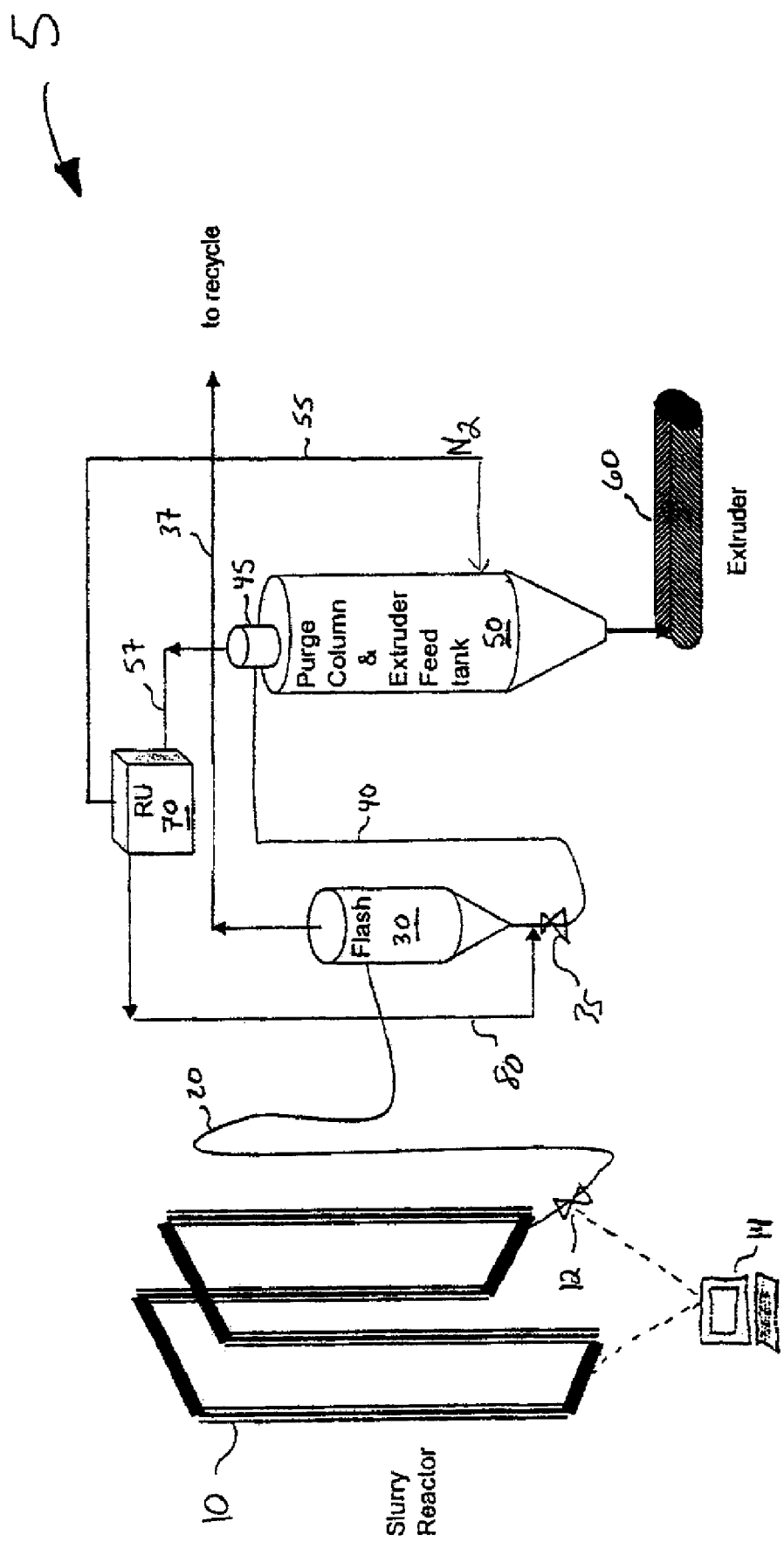
FIG. 1 is a process flow diagram of an embodiment of a system for transferring polymer from a polymerization reactor to an extruder.

FIG. 1 illustrates an embodiment of a system 5 for transferring polymer from a polymerization reactor 10 to a compounding step, such as an extruder 60. The polymerization reactor 10 is connected to a flash chamber 30, a type of separation unit, via a high pressure line 20. Polymer solids produced by the reactor 10 we transferred to the flash chamber 30 via the high pressure line 20. The flash chamber 30 is connected to a purge column 50 and purge gas—solvent/diluent recovery unit (RU) 70 such as an isobutane nitrogen recovery unit. Volatiles remaining with the polymer solids from the reactor 10 are separated from the solids in the flash chamber 30. Recovered volatiles we typically directed from the top of the flash chamber 30 to a recycle line 37. In an embodiment, line 80 supplies a gas comprising nitrogen from the RU 70 to a low pressure line 40 just below the flash chamber 30 and upstream of a valve 35 controlling solids flow from the flash chamber 30. The low pressure line 40 carries polymer solids from the flash chamber 30 to the purge column 50. Line 55 supplies nitrogen from the RU 70 to the purge column. The nitrogen supplied by line 55 further removes volatiles (e.g., isobutane) from the polymer solids in the purge column 50, and line 57 conveys the supplied nitrogen and displaced volatiles from the top of the purge column 50 to the RU 70. In an embodiment, the purge column 50 combines the functions of a purge column and extruder feed tank: recovering volatiles, providing surge vohime capacity, and feeding polymer to the extruder 60.

In an embodiment, polymer (also referred to as "polymer fluff" or "polymer solids") is transferred from the reactor 10 through the high pressure line 20 to the flash chamber 30 via a first pressure differential between the operating pressures of the reactor 10 and the flash chamber 30. The position of the flash chamber 30 relative to the reactor 10 maybe adjusted in order to optimize polymer fluff transfer via the first pressure differential, for example, to minimize or reduce the equipment dedicated to polymer conveyance. In an embodiment, the first pressure differential is the sole means for conveying polymer fluff between the reactor 10 and flash chamber 30.

The size of the first pressure differential impacts the distance the polymer may be transferred between the reactor 10 and flash chamber 30. In an embodiment, the first pressure differential comprises a drop in pressure from equal to or less to about 1,500 psig in the reactor 10 to equal to or greater than about 50 psig in the flash chamber 30; alternatively, a drop from equal to or less than about 1,000 psig to equal to or greater than about 100 psig; alternatively, a drop from equal to or less than about 650 psig to greater than or equal to about 135 psig. In an embodiment, the polymer is polyethylene, the solvent is isobutane, and the first pressure differential comprises a drop in pressure from about 650 psig to about 150 psig. In an embodiment, the polymer is polypropylene and first pressure differential comprises a drop in pressure from about 650 psig to about 225 psig, alternatively, from about 650 psig to about 240 psig. System capacity also impacts the ability of the pressure differential to transfer pounds of polymer over a distance per year. In an embodiment, the pressure differential transfers from about 100 million to about 2 billion pounds per year; alternatively, from about 500 million to about 1.8 billion pounds per year; alternatively, from about 1 to about 1.5 billion pounds per year.

In various embodiments, the polymerization reactor 10 may be a gas phase fluidized bed reactor, loop slurry reactor, stirred tank reactor, axial flow reactor, horizontal gas phase reactor, or combinations thereof. In an embodiment, polymer is continuously withdrawn from the reactor. In an embodiment, polymer is continuously withdrawn from a gas phase fluidized bed reactor. In an embodiment, polymer is continuously withdrawn from a loop slurry reactor. The method provided may also comprise more than one reactor. In an embodiment, the reactor comprises more than one reactor in series. In another embodiment, the more than one reactor in series is operated to pass polymer continuously from one reactor to another.

Operating conditions may vary depending on reactor type. For example, the reactor may be operated at pressures of from about 100 psig to about 60,000 psig. In an embodiment, the reactor may be a loop slurry reactor operated at pressures of from about 550 psig to about 800 psig; alternatively, a gas phase reactor operated at pressures of from about 100 psig to about 500 psig; alternatively, a horizontal gas phase reactor operated at pressures of from about 250 psig to about 350 psig; alternatively, an axial flow reactor operated at pressures of from about 100 psig to about 5000 psig; alternatively, an autoclave reactor operated at pressures of from about 15,000 psig to about 32,500 psig; alternatively, a tabular reactor operated at pressures of from about 30,000 psig to about 60,000 psig.

In an embodiment, the system 5 further comprises a control system 14 for controlling the continuous withdrawal of polymer from the reactor 10. The control system 14 comprises a throttling valve 12 and a means for sensing weight percent solids, reactor pressure, supply of feed streams, fluidized bed height, or combinations thereof In an embodiment, the throttling valve is a solids tolerant valve. In other embodiments, the throttling valve comprises a plug valve, or a ball valve, such as a Vee-Ball valve. The control system 14 monitors and maintains the level of polymer in the reactor 10 by controlling the flow of polymer from the reactor 10 to the flash chamber 30 via the high pressure line 20.

In an embodiment, the reactor product transferred via pressure differential comprises polyolefins, which may be homopolymers or copolymers. In embodiments, the reactor product comprises polyethylene, polypropylene, polybutadiene, polybutene, polymethylpentene, or combinations thereof. In embodiments, the reactor product comprises copolymers of ethylene with propylene, butene, hexene, octene, or combinations thereof. The weight percent solids of the reactor product may vary. In an embodiment, the reactor is a liquid phase reactor (e.g., loop slurry reactor) and comprises from about 0 to about 66 weight percent polyethylene solids.

The flash chamber 30 receives polymer from the reactor 10 via the high pressure line 20. The Rash chamber 30 generally removes diluent, solvent, and/or other volatiles from the polymer fluff/solids. The volatiles exit the top of the flash chamber 30 and are sent to recycle line 37 for reuse in reactor 10. Depending on the type of polymerization reactor involved, and process design, the flash chamber 30 may also be described as a high pressure flash chamber, primary degasser, or powder separator.

The operating pressure of the flash chamber 30 may affect the transport of polymer between the flash chamber 30 and purge column 50. In an embodiment, the flash chamber 30 is operated at a pressure of from about 50 psig to about 500 psig; alternatively, from about 130 psig to about 190 psig.

The flash chamber 30 may be positioned relative to the reactor 10 and purge column 50 in order to optimize layout and minimize cost. The vertical spacing of the flash chamber 30 relative to the reactor 10 and purge column 50 may be optimized. In an embodiment, the flash chamber 30 is at about grade level, where the bottom or outlet end of the flash chamber 30 is positioned at a height no greater than about the height of the bottom or outlet end of the purge column 50. In another embodiment, the bottom of the flash chamber 30 is positioned at a height no greater than about the height of the top or inlet end of the purge column 50. In another embodiment, the bottom of the flash chamber 30 is positioned at a height equal to or greater than the height of the top of the purge column 50. In another embodiment, the bottom of the flash chamber 30 is positioned at a vertical height relative to grade minimally sufficient (that is, without unnecessary excess height) to allow for placement of valve 35 and transfer line (e.g., low pressure line 40) below the flash chamber 30. In another embodiment, the bottom of the flash chamber is positioned at a vertical height relative to grade of about 0 feet; alternatively, about 10 feet; alternatively, about 25 feet, alternatively, about 50 feet; alternatively about 100 feet; alternatively about 500 feet.

The horizontal distance between the flash chamber 30 and the reactor 10 may also be adjusted to optimize layout and cost. In an embodiment, the first pressure differential transfers the polymer to a flash chamber 30 that is from about 0 to about 3,000 horizontal feet from the reactor 10; alternatively, the flash chamber 30 is from about 0 to about 1,500 horizontal feet from the reactor 10; alternatively, the flash chamber 30 is from about 100 to about 1,500 horizontal feet from the reactor 10; alternatively, the flash chamber 30 is from about 100 to about 500 horizontal feet from the reactor 10; alternatively, the flash chamber 30 is from about 200 to about 500 horizontal feet from the reactor 10. In various embodiments, the polymer may travel a linear distance in x, y, and z coordinates, for example through circuitous pipe routing, that is greater than the horizontal distance, the vertical spacing/distance, or both.

In an embodiment, a second pressure differential between the operating pressures of the flash chamber 30 and purge column 50 transports polymer fluff from the flash chamber 30 to the purge column 50 via the low pressure line 40. In an embodiment, the second pressure differential comprises a drop in pressure from equal to or less than about 500 psig in the flash chamber 30 to equal to or greater than about negative 5 (−5) psig in the purge column 50; alternatively, a drop from equal to or less than about 300 psig to equal to or greater than about 0 psig; alternatively, a drop from equal to or less than about 150 psig to equal to or greater than about 2 psig. In an embodiment, employment of a pressure differential to transport polymer from the flash chamber 30 to the purge column 50 eliminates the need for the flash chamber 30 to be positioned at a height greater than the purge column 50. The distance the polymer must be transported from the flash chamber 30 to the purge column 50 may be adjusted in order to optimize polymer fluff transport via the second pressure differential, for example, to minimize or reduce the equipment dedicated to conveyance.

In an embodiment, the second pressure differential is the only mode of transporting the polymer, thus avoiding the cost of powered conveyance equipment. In another embodiment, a restricted pipe discharge system (RPDS) is employed alone or in combination with the second pressure differential to transport the polymer from the flash chamber 30 to the purge column 50. In an RPDS embodiment, the valve 35 is moved from the beginning of the low pressure line 40 near the flash chamber 30 to the end of the low pressure line 40 near the purge column 50, for example at the bottom of a solids-gas separation tank such as disengaging vessel 45. In another embodiment, a pneumatic conveying system including equipment such as, for example, one or more blowers is employed alone or in combination with second pressure differential to transport the polymer from the flash chamber 30 to the purge column 50.

The purge column 50 receives polymer from the flash chamber 30 via the low pressure line 40. In an embodiment, the purge column 50 is operated at a pressure of from about 150 psig to about −5 psig; alternatively, from about 25 psig to about 0 psig; alternatively from about 10 psig to about 2 psig. The purge column 50 generally employs a stripping or purge gas, such as nitrogen, fed near the bottom of the purge column. The purge gas is purified of volatiles and recycled to the purge column via a purge gas—solvent/diluent recovery unit such as isobutane nitrogen recovery unit (RU) 70. The purged volatiles (e.g., isobutane) exit the purge column 50 along with the nitrogen carrier gas via a line 57 that feeds to the RU 70, where the volatiles are removed from the nitrogen via compression, condensation, absorption, adsorption, a membrane, combinations thereof or other separation means. Nitrogen is recycled from RU 70 to the purge column 50 via line 55 to farther purge residual volatiles from the polymer solids.

In an embodiment, the purge line 80 is fed into the low pressure line 40 upstream of a valve 35 controlling the flow of polymer from the flash chamber 30. The valve controlling the flow of solids from and the level of solids in the flash chamber may comprise a Vee-Ball valve, one or more ball valves, a rotary valve, or combinations thereof In an embodiment, gases from the purge line 80 displace flash gas that is in the interstitial area between particles and to improve the recovery efficiency of the flash chamber 30. In an embodiment, from about 50 to about 98 weight percent of the interstitial gases from flash tank 30 are displaced from the polymer solids exiting the flash chamber 30 such that flash efficiency is increased from about 85 to about 90 weight percent recovery to from about 92 to about 99.8 weight percent recovery. Flash efficiency is the amount of flash gas recovered from the flash tank 30 (e.g., via line 37) divided by the total amount of gas and/or liquid with the polymer that enters the flash tank 30 from the reactor 10 via line 20.

In an embodiment, gases from the purge line 80 also provide additional motive force for transporting fluff through the low pressure line 40 to the purge column 50 when the system production rate and/or line velocity therein is too low for pneumatic conveying via the second pressure drop alone. The gases from purge line 80 are conveyed along with the polymer fluff via low pressure line 40 to the top of the purge column 50. In an embodiment, the low pressure line 40 feeds the gases and polymer fluff directly to the purge column 50, wherein gases are separated from the polymer fluff and returned to RU 70 via line 57 and polymer solids are gravity fed to the extruder 60. In other words, the polymer fluff is sent directly to the purge column 50 without the use of a step down valve, cycling valve, or similar valve configuration.

In an RPDS embodiment, the low pressure line 40 feeds the gases and polymer fluff to a disengaging vessel 45 upstream of the purge column. In an embodiment, tie disengaging vessel 45 is adjacent or integral with the purge column, as shown in FIG. 1. The gases are separated from the polymer fluff via the disengaging vessel 45 and the purge column 50 and are returned to the RU 70 via line 57. The polymer solids are subsequently gravity fed via a valve, such as a Vee-Ball valve, one or more ball valves, a rotary valve, or combinations thereof, from the disengaging vessel 45 to the purge column 50 to the extruder 60. The opening of the valve at the bottom of the disengaging vessel 45 may be used to control solids level in flash chamber 30.

The purge column 50 may be employed in various configurations when achieving the benefits of the method provided. In an RPDS embodiment, a disengaging vessel 45 is operated between the flash chamber 30 and purge column 50, where the purge column 50 receives polymer from the disengaging vessel 45, typically via gravity feed. The purge column 50 of FIG. 1 may offer the benefits of combining other pieces of equipment into one vessel. In an embodiment, the purge column 50 comprises the functions of a disengaging vessel, a purge column, and an extruder feed tank. If the purge column 50 is separate from the extruder feed tank, gravity may be employed to move polymer from the purge column 50 to the extruder feed tank. Whether the disengaging vessel 45, the purge column 50, and extruder feed tank capabilities are achieved in one, two, or three pieces of equipment may be dictated by process and cost efficiencies.

Employment of one or more pressure differentials as the mode of transporting polymer between a reactor 10 and purge column 50 may permit placement of the purge column 50 such that layout is optimized and costs are minimized. In an embodiment, the purge column 50 is located from greater than or equal to about 0 to less than or equal to about 3,000 horizontal feet from the reactor 10; alternatively, from greater than or equal to about 0 to less than or equal to about 1,500 horizontal feet from the reactor 10; alternatively, from greater than or equal to about 0 to less than or equal to about 500 horizontal feet from the reactor 10; alternatively, from greater than or equal to about 0 to less than or equal to about 100 horizontal feet from the reactor 10. In another embodiment the bottom of the purge column is positioned at a vertical height relative to grade of about 0 feet; alternatively, about 10 feet; alternatively, about 25 feet, alternatively, about 50 feet; alternatively about 100 feet; alternatively about 500 feet.

Heating of the high pressure line 20, the low pressure line 40 or both may be employed to maintain the temperature of the polymer as it is transferred via pressure drop. In an embodiment, flashline heaters, e.g., steam or hot water jackets, are employed to execute heating of the high pressure line 20 and low pressure line 40. In another embodiment, the heating of the polymer comprises microwave heating in the high pressure line 20 between the reactor 10 and flash chamber 30, in the low pressure lie 40 between the flash chamber 30 and purge column 50, or in both the high pressure line 20 and low pressure line 40. With microwave heating, as polymer exits the reactor 10 water may be added in the high pressure line 20, for example downstream of valve 12, in order to kill any catalyst and provide a microwave heating absorbent. In other embodiments, the heating of the polymer may also comprise steam heating, hot water heating, other heat exchange, or combinations thereof. The heating may be controlled so that it does not cause the polymer to reach the melting or softening temperature. In an embodiment, the polymer is polyethylene and the heating results in a polymer temperature of greater than or equal to about 0° F. and less than or equal to about 230° F.; alternatively, greater than or equal to about 0° F. and less than or equal to about 180° F. In an embodiment, the polymer is polypropylene and the heating results in a polymer temperature of greater than or equal to about 0° F. and less than or equal to about 250° F.; alternatively, greater than or equal to about 0° F. and less than or equal to about 220° F.; alternatively, greater than or equal to about 0° F. and less than or equal to about 170° F.

In an embodiment, the reactor 10 is a slurry loop reactor comprising ethylene monomer, 1-hexene comonomer, and isobutane as solvent. The slurry loop reactor operates at a pressure of about 650 psig, the flash chamber 30 operates at a pressure of about 135 psig, and the purge column 50 operates at a pressure of from greater than about 0 psig to about 5 psig. The polymer is conveyed directly from the flash chamber 30 into the purge column 50 without passing through one or more additional processing vessels such as an additional flash chamber, a dryer, or both.

The benefits of the method provided may be realized in the form of a variety of process and cost efficiencies. For example, some capital costs may be reduced by about 25 to 40 percent. Other examples of such benefits recognizable by those skilled in the art include elimination of a flash structure; elimination of fluff and pellet storage; elimination of fluff and pellet blowers; reduction of purge column size and residence time; reduction of pipe and electrical racks; reduction of number of motors; reduction of number of DCS I/O points; reduction of required plant footprint; safer hot surfaces at the bottom of the extruder tank; reduction in size of the pressure swing absorption beds in the RU; improving flash gas recovery efficiency in the high pressure flash chamber up to about 99.8 weight percent; and combinations thereof.

While the present invention has been illustrated and described above in terms of particular apparatus and methods of use, it is apparent that, having the benefit of the teachings herein, equivalent techniques, equipment, and ingredients may be substituted for those shown, and other changes can be made within the scope of the present invention as defined by the appended claims.

What is claimed as our invention is:

1. A method for transferring polymer within a polymerization system, comprising:
   continuously withdrawing polymer from a gas phase fluidized bed reactor;
   continuously conveying the withdrawn polymer from the gas phase fluidized bed reactor to a separation unit via a pressure differential between the gas phase fluidized bed reactor and the separation unit; and
   continuously withdrawing polymer from the separation unit and conveying the polymer withdrawn from the separation unit to a purge column via a pressure differential between the separation unit and the purge column.

2. The method of claim 1 wherein the separation unit is a powder separator.

3. The method of claim 1 wherein from about 50 to about 98 weight percent of interstitial gases are separated from the polymer in the separation unit.

4. The method of claim 1 wherein the polymer is a homopolymer or copolymer comprising polyethylene, polypropylene, or both.

5. The method of claim 1 further comprising one or more loop slurry reactors in series upstream from the gas phase fluidized bed reactor conveying withdrawn polymer to the separation unit.

6. A method for transferring polymer within a polymerization system, comprising:
   continuously withdrawing polymer from a first gas phase fluidized bed reactor;
   conveying the withdrawn polymer from the first gas phase fluidized bed reactor to a second gas phase fluidized bed reactor via a pressure differential between the first and second gas phase fluidized bed reactors;
   continuously withdrawing polymer from the second gas phase fluidized bed reactor and conveying the withdrawn polymer to a separation unit via a pressure differential between the second gas phase fluidized bed reactor and the separation unit; and
   continuously withdrawing polymer from the separation unit and conveying the polymer withdrawn from the separation unit to a purge column via a pressure differential between the separation unit and the purge column.

7. The method of claim 6 wherein the separation unit is a powder separator.

8. The method of claim 6 wherein the polymer is a homopolymer or copolymer comprising polyethylene, polypropylene, or both.

9. The method of claim 6 wherein at least two loop slurry reactors are located upstream of the first gas phase fluidized bed reactor.

10. A method for transferring polymer within a polymerization system having a series of reactors, comprising:
    continuously withdrawing polymer from a first loop slurry reactor and conveying the withdrawn polymer to a first gas phase fluidized bed reactor via a pressure differential between the first loop slurry reactor and the first gas phase fluidized bed reactor;
    continuously withdrawing polymer from the first gas phase fluidized bed reactor and conveying the withdrawn polymer to a second gas phase fluidized bed reactor in series with the first gas phase fluidized bed reactor;
    continuously withdrawing polymer from the second gas phase fluidized bed reactor in the reactor series and conveying the withdrawn polymer to a separation unit via a pressure differential between the second gas phase fluidized bed reactor and the separation unit; and
    continuously withdrawing polymer from the separation unit and conveying the polymer withdrawn from the separation unit to a purge column via a pressure differential between the separation unit and the purge column.

11. The method of claim 10 wherein the separation unit is a powder separator.

12. The method of claim 10 wherein the polymer is a homopolymer or copolymer comprising polyethylene, polypropylene, or both.

13. The method of claim 10 wherein the pressure differential between the first loop slurry reactor and the first gas phase fluidized bed reactor is a pressure drop of from about 550-800 psig in the first loop slurry reactor to about 100-500 psig in the first gas phase fluidized bed reactor.

14. The method of claim 10 further comprising a valve to control the flow of polymer from the first loop slurry reactor to the first gas phase fluidized bed reactor.

15. The method of claim 10 wherein from about 50 to about 98 weight percent of the interstitial gases are separated from the polymer in the separation unit.

16. The method of claim 10 wherein the polymer is continuously withdrawn and conveyed through the reactor series via a pressure differential across the reactor series.

17. The method of claim 1 wherein the gas phase fluidized bed reactor operates at a pressure from about 100 psig to about 500 psig, wherein the separation unit operates at a pressure from about 50 psig to about 500 psig, and wherein the purge column operates at a pressure from about 150 psig to about −5 psig.

18. The method of claim 17 wherein the separation unit operates at a pressure from about 130 psig to about 190 psig, and wherein the purge column operates at a pressure from about 25 psig to about 0 psig.

19. The method of claim 18 wherein the gas phase reactor is from about 100 horizontal feet to about 1,500 horizontal feet away from the separation unit, and wherein the bottom of the separation unit is not higher than about the top of the purge column.

20. The method of claim 5 wherein the loop reactor operates at a pressure from about 550 psig to about 800 psig, wherein the gas phase fluidized bed reactor operates at a pressure from about 100 psig to about 500 psig, wherein the separation unit operates at a pressure from about 50 psig to about 500 psig, and wherein the purge column operates at a pressure from about 150 psig to about −5 psig.

21. The method of claim 6 wherein the pressure differential between the flash chamber and the purge column comprises a drop in pressure of from equal to or less than about 500 psig in the flash chamber to equal to or greater than about −5 psig in the purge column.

* * * * *